(12) United States Patent
Cho et al.

(10) Patent No.: US 11,791,095 B2
(45) Date of Patent: Oct. 17, 2023

(54) MULTILAYER ELECTRONIC COMPONENT

(71) Applicant: SAMSUNG ELECTRO-MECHANICS CO., LTD., Suwon-si (KR)

(72) Inventors: Min Jung Cho, Suwon-si (KR); Yu Hong Oh, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 150 days.

(21) Appl. No.: 17/410,328

(22) Filed: Aug. 24, 2021

(65) Prior Publication Data
US 2022/0157525 A1 May 19, 2022

(30) Foreign Application Priority Data
Nov. 18, 2020 (KR) .................. 10-2020-0154771

(51) Int. Cl.
H01G 4/008 (2006.01)
H01G 4/012 (2006.01)
H01G 4/30 (2006.01)
H01G 4/248 (2006.01)
H01G 4/232 (2006.01)
H01G 4/12 (2006.01)

(52) U.S. Cl.
CPC .......... *H01G 4/0085* (2013.01); *H01G 4/012* (2013.01); *H01G 4/1227* (2013.01); *H01G 4/2325* (2013.01); *H01G 4/248* (2013.01); *H01G 4/30* (2013.01)

(58) Field of Classification Search
CPC ........ H01G 4/30; H01G 4/012; H01G 4/1227; H01G 4/2325; H01G 4/008; H01G 4/0085; H01G 4/12; H01G 4/224; H01G 4/228; H01G 4/232; H01G 4/248; H01G 2/065; H01G 4/1218
See application file for complete search history.

(56) References Cited

U.S. PATENT DOCUMENTS

| 2004/0197936 | A1* | 10/2004 | Koinuma | ............... C30B 25/18 438/2 |
| 2004/0256603 | A1* | 12/2004 | Celik | .................. C22C 1/0425 252/500 |
| 2005/0088803 | A1* | 4/2005 | Umeda | ............... C04B 35/6303 361/321.2 |
| 2009/0067117 | A1* | 3/2009 | Kasuya | .................... H01G 4/30 156/89.18 |

(Continued)

FOREIGN PATENT DOCUMENTS

| JP | 2015-023209 A | 2/2015 |
| KR | 10-2015-0036391 A | 4/2015 |
| KR | 10-2019-0121150 A | 10/2019 |

*Primary Examiner* — Michael P McFadden
(74) *Attorney, Agent, or Firm* — MORGAN, LEWIS & BOCKIUS LLP

(57) ABSTRACT

A multilayer electronic component includes a body including a dielectric layer and internal electrodes alternately stacked with the dielectric layer interposed therebetween; and an external electrode disposed on the body and connected to the internal electrodes. One of the internal electrodes includes Ni, and a lattice constant of Ni included in the one of the internal electrodes satisfies a range of 3.53 Å to 3.72 Å.

18 Claims, 5 Drawing Sheets

(56) References Cited

U.S. PATENT DOCUMENTS

| | | | |
|---|---|---|---|
| 2011/0020169 A1* | 1/2011 | Sawada | G11B 5/667 |
| | | | 420/441 |
| 2013/0141835 A1* | 6/2013 | Hwang | H01G 4/30 |
| | | | 29/829 |
| 2013/0286539 A1* | 10/2013 | Kim | H01G 13/006 |
| | | | 264/615 |
| 2015/0170838 A1 | 6/2015 | Suzuki et al. | |
| 2015/0380159 A1* | 12/2015 | Lee | H01G 4/012 |
| | | | 156/89.12 |
| 2019/0267189 A1* | 8/2019 | Makino | H01G 4/1227 |
| 2020/0058442 A1 | 2/2020 | Cha et al. | |
| 2020/0058444 A1* | 2/2020 | Cha | H01G 4/008 |

\* cited by examiner

MULTILAYER ELECTRONIC COMPONENT

CROSS-REFERENCE TO RELATED APPLICATION(S)

This application claims benefit of priority to Korean Patent Application No. 10-2020-0154771 filed on Nov. 18, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a type of multilayer electronic component, may be a chip type capacitor mounted on the printed circuit boards of various types of electronic products such as image display devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacity, and relative ease of mounting. As sizes of the components of electronic devices decrease, demand for decreasing the size and increasing the capacitance of multilayer ceramic capacitors is increasing.

In order to decrease the size and increase the capacitance of a multilayer ceramic capacitor, a technology capable of thinning a thickness of an internal electrode and a dielectric layer is required.

In addition, in an internal electrode containing Ni as a main material and a dielectric layer containing a component such as $BaTiO_3$ or the like as a main material, a difference in lattice constants of atoms forming each material may be generated. In this case, a phenomenon in which an atomic arrangement is dislocated on an interface on which the internal electrode and the dielectric layer are stacked may occur. Mismatch according to the dislocation of the atomic arrangement between the internal electrode and the dielectric layer may have a problem of increasing stress of the interface and accelerating aggregation of the electrode.

Accordingly, there may be a need for a technology for reducing dislocation of an atomic arrangement occurring on an interface between an internal electrode and a dielectric layer, along with technical demand for small size and high capacitance of a multilayer ceramic capacitor.

SUMMARY

An aspect of the present disclosure is to provide a multilayer electronic component increasing a lattice constant of Ni, which may be a main material of an internal electrode, to reduce dislocation of an atomic arrangement between the internal electrode and a dielectric layer.

However, the object of the present disclosure is not limited to the above description, and will be more easily understood in the process of describing specific embodiments of the present disclosure.

According to an aspect of the present disclosure, a multilayer electronic component includes a body including a dielectric layer and internal electrodes alternately stacked with the dielectric layer interposed therebetween; and an external electrode disposed on the body and connected to the internal electrodes. One of the internal electrodes includes Ni, and a lattice constant of Ni included the one of the internal electrodes satisfies a range of 3.53 Å to 3.72 Å.

According to an aspect of the present disclosure, a multilayer electronic component includes a body including a dielectric layer and internal electrodes alternately stacked with the dielectric layer interposed therebetween; and an external electrode disposed on the body and connected to the internal electrodes. 0.1 wt %≤W≤4.0 wt %, in which W is a sum of mass ratios of Cu and Sn of one of the internal electrodes relative to a total mass of the one of the internal electrodes.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
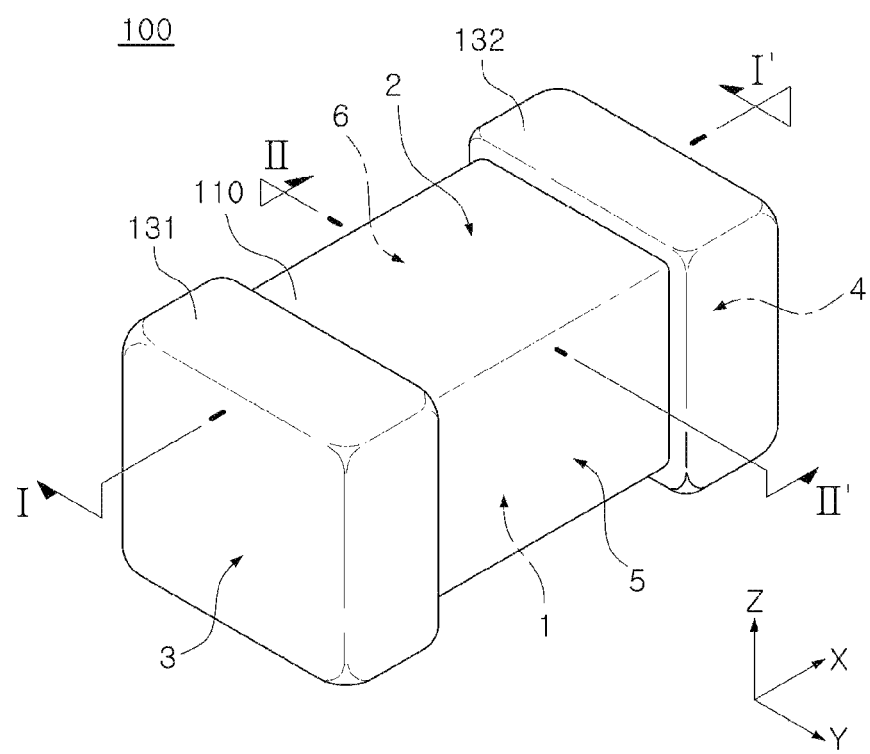
FIG. 1 is a perspective view schematically illustrating a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

When directions are defined in order to clearly describe embodiments of the present disclosure, X, Y, and Z indicated in the drawings represent a length direction, a width direction, and a thickness direction of a multilayer electronic component, respectively.

In addition, in the present specification, the length direction may be used as an X direction or a first direction, the width direction may be used as a Y direction or a second direction, and the thickness direction may be used as a Z direction, a third direction, or a stacking direction.

Multilayer Electronic Component

Figure 2:
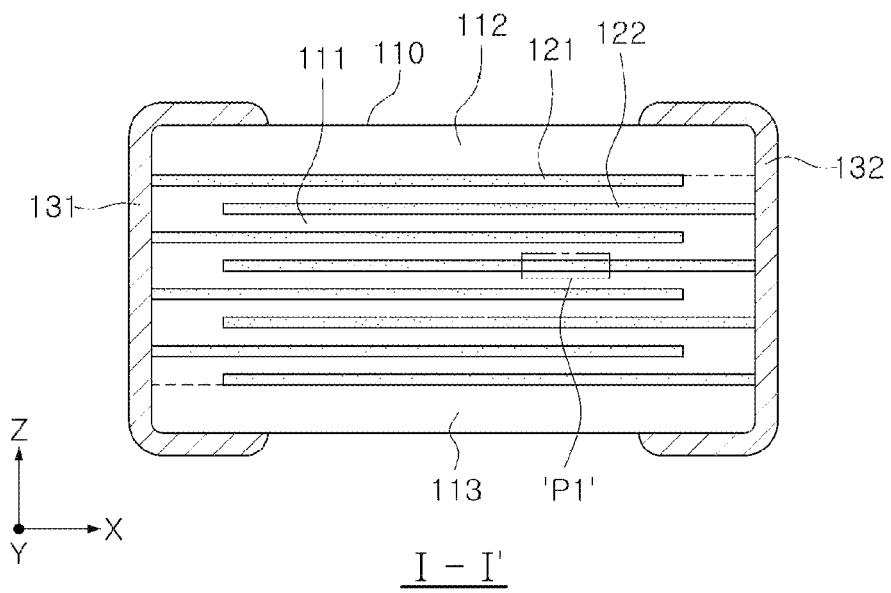
FIG. 2 is a cross-sectional view of FIG. 1, taken along line I-I'.
Figure 3:
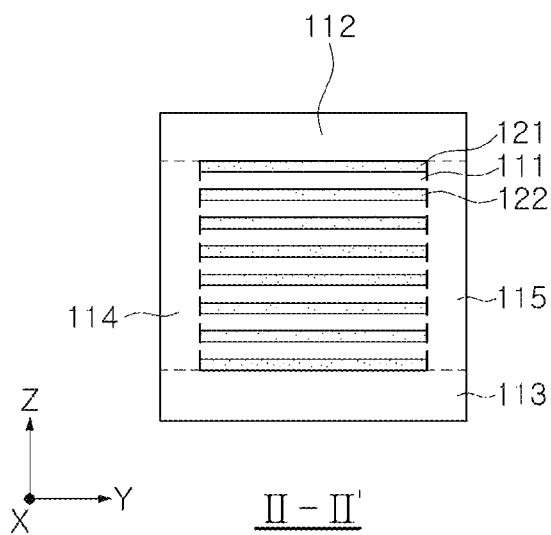
FIG. 3 is a cross-sectional view of FIG. 1, taken along line II-II'.
Figure 4:
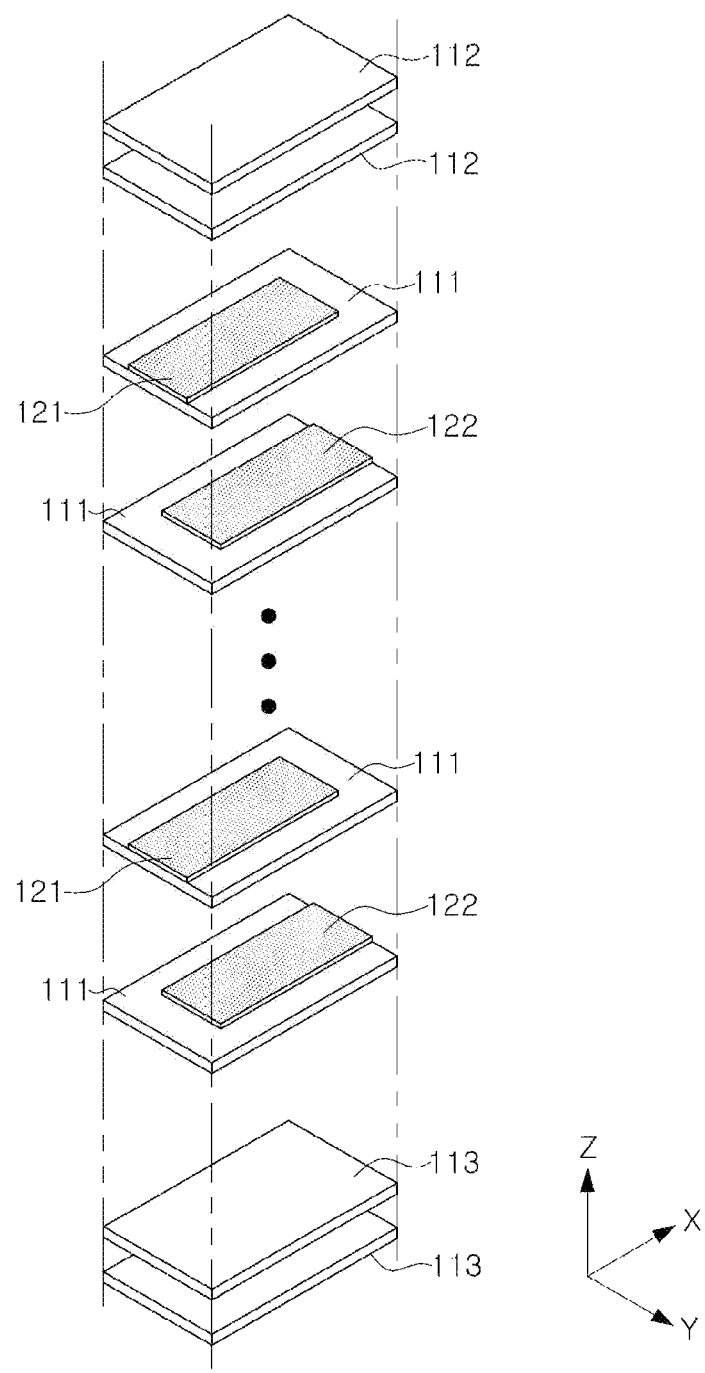
FIG. 4 is an exploded perspective view schematically illustrating a body in which a dielectric layer and an internal electrode are stacked, according to an embodiment of the present disclosure.

FIG. 1 is a perspective view schematically illustrating a multilayer electronic component according to an embodiment of the present disclosure. FIG. 2 is a cross-sectional view of FIG. 1, taken along line I-I'. FIG. 3 is a cross-sectional view of FIG. 1, taken along line FIG. 4 is an exploded perspective view schematically illustrating a body in which a dielectric layer and an internal electrode are stacked, according to an embodiment of the present disclosure.

First, a multilayer electronic component according to an embodiment of the present disclosure will be described with reference to FIGS. 1 to 4.

A multilayer electronic component 100 according to an embodiment of the present disclosure may include a body 110 including a dielectric layer 111 and internal electrodes 121 and 122 alternately disposed with the dielectric layer 111 interposed therebetween, and external electrodes 131 and 132 disposed on the body 110 and connected to the internal electrodes 121 and 122.

In this case, respective internal electrodes 121 and 122 includes Ni, and a lattice constant of Ni included in respective internal electrodes 121 and 122 may satisfy a range of 3.53 Å to 3.72 Å.

The body 110 may be formed by alternately stacking the dielectric layer 111 and the internal electrodes 121 and 122.

Although the specific shape of the body 110 is not particularly limited, the body 110 may have a hexahedral shape or the like as illustrated. Due to shrinkage of ceramic powder particles included in the body 110 during a sintering process, the body 110 may not have a perfectly rectangular parallelepiped shape, but may have a substantially hexahedral shape.

The body 110 may have first and second surfaces 1 and 2 opposing each other in the thickness direction (the Z direction), third and fourth surfaces 3 and 4 connected to the first and second surfaces 1 and 2 and opposing each other in the longitudinal direction (the X direction), and fifth and sixth surfaces 5 and 6 connected to the first to fourth surfaces 1, 2, 3, and 4, and opposing each other in the width direction (the Y direction).

The plurality of dielectric layers 111 forming the body 110 may be in a sintered state, and a boundary between adjacent dielectric layers 111 may be apparent without using a scanning electron microscope (SEM).

A dielectric layer 111 according to an embodiment of the present disclosure may be formed of various materials, but may include $BaTiO_3$, for example, and may have especially $BaTiO_3$ as a main component.

In this case, according to the present embodiment, a difference in lattice constants between a dielectric layer 111 containing $BaTiO_3$ as a main component and internal electrodes 121 and 122 containing Ni as a main component may be reduced to suppress occurrence of dislocation between atoms on an interface between the dielectric layer 111 and the internal electrodes 121 and 122.

The dielectric layer containing $BaTiO_3$ as a main component may have a lattice constant of about 3.999 Å due to $BaTiO_3$. The internal electrode containing Ni as a main component may have a lattice constant, between Ni atoms, of 3.52 Å. In this case, when a difference in lattice constants between the dielectric layer and the internal electrode is calculated, a value corresponding to about 0.479 Å may be obtained.

In this manner, due to the difference in lattice constants between the Ni atoms of the internal electrode containing Ni as a main component and $BaTiO_3$ forming the dielectric layer, a dislocation phenomenon in which atoms are not aligned on respective interfaces on which the dielectric layer and the internal electrode are stacked (i.e. mismatch between atoms) may occur.

This dislocation phenomenon may increase stress of the interface between the dielectric layer and the internal electrode, and may accelerate aggregation of the internal electrodes. Therefore, connectivity of the internal electrodes may be deteriorated, and a breaking down voltage (BDV) and high-temperature reliability of a multilayer electronic component may be deteriorated.

A multilayer electronic component 100 according to an embodiment of the present disclosure may add a component having an atomic size larger than that of Ni to internal electrodes 121 and 122 to form internal electrodes 121 and 122 containing Ni as a main component, to increase a lattice constant, as compared to an internal electrode formed only of a Ni atom.

Therefore, a difference in lattice constants between Ni of the internal electrodes 121 and 122 and the atoms forming the dielectric layer 111 may be reduced, to further reduce a dislocation phenomenon occurring on an interface between the dielectric layer 111 and the internal electrodes 121 and 122.

In this case, the internal electrodes 121 and 122 according to the present embodiment may be characterized in that a difference in lattice constants between $BaTiO_3$ included in the dielectric layer 111 and Ni included in the internal electrodes 121 and 122 is 0.469 Å or less. For example, a type and amass ratio of components added to the internal electrodes 121 and 122 may be adjusted, to have a lattice constant greater than or equal to 0.01 Å, as compared to a conventional lattice constant in a case formed only of Ni atoms.

As described above, a detailed description regarding components and mass ratios added to the internal electrodes 121 and 122, according to embodiments of the present disclosure, will be described in more detail using measured values of experimental examples below.

A raw material of the dielectric layer 111 is not particularly limited, as long as sufficient capacitance may be obtained. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, in which calcium (Ca), zirconium (Zr), or the like is partially dissolved into $BaTiO_3$, or the like.

In addition, various ceramic additives, organic solvents, binders, dispersants, or the like may be added to the powder of barium titanate ($BaTiO_3$), and the like, as the material for forming the dielectric layer 111.

The body 110 may include a capacitance formation portion and cover portions 112 and 113 formed above and below the capacitance formation portion.

The capacitance formation portion may contribute to capacitance formation of a capacitor, and may be formed by repeatedly stacking the plurality of first and second internal electrode layers 121 and 122 with the dielectric layer 111 interposed therebetween.

The upper cover portion 112 and the lower cover portion 113 may be formed by stacking the single dielectric layer or the two or more dielectric layers on upper and lower surfaces of the capacitance formation portion, respectively, in the vertical direction, and may basically play a role in preventing damage to the internal electrodes due to physical or chemical stress.

The upper cover portion 112 and the lower cover portion 113 may not include internal electrodes, and may include the same material as the dielectric layer 111. For example, the upper cover portion 112 and the lower cover portion 113 may include a ceramic material, for example, a barium titanate ($BaTiO_3$)-based ceramic material.

In addition, margin portions 114 and 115 may be disposed on lateral surfaces of the capacitance formation portion. The margin portions 114 and 115 may basically play a role in preventing damage to the internal electrodes due to physical or chemical stress.

The margin portions 114 and 115 may include a margin portion 114 disposed on the sixth surface 6 of the body 110 and a margin portion 115 disposed on the fifth surface 5 of the body 110. For example, the margin portions 114 and 115 may be disposed on both lateral surfaces of the ceramic body 110 in the width direction.

As illustrated in FIG. 3, the margin portions 114 and 115 may refer to regions between both ends of the first and second internal electrodes 121 and 122, and an external surface of the body 110, in a cross-section of the body 110 cut in a width-thickness (YZ) direction.

In this case, the margin portions 114 and 115 may be formed by applying a conductive paste to a ceramic green sheet to form the internal electrodes, except for a portion in which the margin portions are formed.

In addition, in order to suppress a step difference caused by the internal electrodes 121 and 122, after stacking, the internal electrodes may be cut to be exposed from the fifth and sixth surfaces 5 and 6 of the body 110, and then a single dielectric layer or two dielectric layers may be stacked on both lateral surfaces of the capacitance formation portion in the width direction, to form margin portions 114 and 115

The internal electrodes 121 and 122 may be alternately stacked with the dielectric layer 111.

The internal electrodes 121 and 122 may include first and second internal electrodes 121 and 122. The first and second internal electrodes 121 and 122 may be alternately disposed to oppose each other with a dielectric layer 111, forming the body 110, interposed therebetween, and may be exposed respectively from the third and fourth surfaces 3 and 4 of the body 110.

Referring to FIG. 2, the first internal electrode 121 may be spaced apart from the fourth surface 4 and exposed from the third surface 3, and the second internal electrode 122 may be spaced apart from the third surface 3 and exposed from the fourth surface 4.

In this case, the first and second internal electrodes 121 and 122 may be electrically separated from each other by a dielectric layer 111 disposed therebetween.

Referring to FIG. 4, a body 110 may be formed by alternately stacking a ceramic green sheet on which a first internal electrode 121 is printed and a ceramic green sheet on which a second internal electrode 122 is printed, and sintering the same.

Internal electrodes 121 and 122 according to an embodiment of the present disclosure may include Ni, and a lattice constant of Ni included in respective internal electrodes 121 and 122 may satisfy a range of 3.53 Å to 3.72 Å.

Although an internal electrode made of Ni atoms may have a lattice constant of 3.52 Å, a lattice constant of Ni in the present embodiment may be increased by adding a component having an atomic size, larger than that of Ni, to the internal electrodes 121 and 122 having Ni as a main component. For example, some of the Ni atoms forming the lattice constant may be replaced with atoms of a component having an atomic size, larger than that of Ni, to increase averagely a lattice constant of Ni.

The internal electrodes 121 and 122 may include Ni as a main component, and may further include a component having anatomic size, larger than that of Ni. In addition, the internal electrodes 121 and 122 may include components having substantially the same atomic size as that of Ni. In this case, when different atoms are partially replaced between the Ni atoms, repulsive force may act between the Ni atoms and the corresponding atoms to increase a lattice constant.

For example, respective internal electrodes 121 and 122 may further include one or more components selected from Cu, Sn, Co, Sb, Ru, Pd, Ag, In, Bi, Re, Os, Ir, Pt, and Au. The internal electrodes 121 and 122 containing Ni as a main component and to which at least one component selected from Cu, Sn, Co, Sb, Ru, Pd, Ag, In, Bi, Re, Os, Ir, Pt, and Au is added, may have a configuration in which some Ni atoms are replaced with other atoms such as Cu or the like, in a lattice structure composed of Ni atoms. Therefore, a lattice constant of Ni included in respective internal electrodes 121 and 122 according to the present embodiment may increase.

As an embodiment, copper (Cu) may be further included in the internal electrodes 121 and 122 containing Ni as a main component. In particular, the internal electrodes 121 and 122 of the present embodiment may be characterized by containing 96.0 to 99.9 wt % of Ni and 0.1 to 4.0 wt % of Cu.

When a portion of Cu is added to the internal electrodes 121 and 122, portions of Ni atoms may be replaced with Cu in an Ni lattice structure forming the internal electrodes 121 and 122. In this case, the internal electrodes 121 and 122 may include a crystal form of $Ni_8Cu_4$. For example, the internal electrodes 121 and 122 according to the present embodiment may form a lattice structure in which four (4) out of twelve (12) Ni atoms are replaced with Cu atoms.

Copper (Cu) may have an atomic size of 0.128 nm, which corresponds to a value larger than that of nickel (Ni) (0.125 nm). Therefore, a lattice constant of a structure in which some atoms are replaced with Cu may have a higher value, as compared to a structure formed only of Ni atoms.

In this case, when Cu is included in a range of 0.1 to 4.0 wt % in respective internal electrodes 121 and 122, a difference in lattice constants between respective internal electrodes 121 and 122 and the dielectric layer 111 may be effectively reduced, and electrode connectivity of the internal electrodes 121 and 122 may be improved at the same time.

When a mass ratio of Cu included in respective internal electrodes 121 and 122 is lower than 0.1 wt %, an effect of increasing a lattice constant of Ni may not be sufficiently exhibited due to a very small amount of Cu atoms to be replaced.

When a mass ratio of Cu included in respective internal electrodes 121 and 122 exceeds 4.0 wt %, a negative effect of decreasing connectivity of the internal electrodes 121 and 122 may be generated due to excessive addition of Cu, having a lower melting point than Ni.

As another embodiment, tin (Sn) may be further included in the internal electrodes 121 and 122 containing Ni as a main component. In particular, respective internal electrodes 121 and 122 of the present embodiment may be characterized by including 97.0 to 99.9 wt % of Ni and 0.1 to 3.0 wt % of Sn.

When a portion of Sn is added to the internal electrodes 121 and 122, portions of Ni atoms may be replaced with Sn, in an Ni lattice structure forming the internal electrodes 121 and 122. Tin (Sn) may have an atomic size of 0.141 nm, which corresponds to a value larger than that of nickel (Ni) (0.125 nm). Therefore, a lattice constant of a structure in which some atoms are replaced with Sn may have a higher value, as compared to a structure formed only of Ni atoms.

In this case, when Sn is included in a range of 0.1 to 3.0 wt % in respective internal electrodes 121 and 122, a difference in lattice constants between respective internal electrodes 121 and 122 and the dielectric layer 111 may be effectively reduced, and electrode connectivity of the internal electrodes 121 and 122 may be improved at the same time.

When a mass ratio of Sn included in each of the internal electrodes 121 and 122 is less than 0.1 wt %, an effect of increasing a lattice constant of Ni may not be sufficiently exhibited due to a very small amount of Sn atoms to be replaced.

When a mass ratio of Sn included in respective internal electrodes 121 and 122 exceeds 3.0 wt %, a negative effect of decreasing connectivity of the internal electrodes 121 and 122 may be generated due to excessive addition of Sn, having a lower melting point than Ni.

In another embodiment, copper (Cu) and tin (Sn) may be further included in the internal electrodes 121 and 122 containing Ni as a main component. In particular, in the internal electrodes 121 and 122 of the present embodiment, if the sum of mass ratios of Cu and Sn relative to a total mass of respective internal electrodes is defined as W, the W may be characterized by satisfying 0.1 wt %≤W≤4.0 wt %.

When Cu and Sn are added to the internal electrodes 121 and 122 together, some Ni atoms may be replaced with Cu and Sn atoms, respectively, in an Ni lattice structure forming the internal electrodes 121 and 122. In this case, respective internal electrodes 121 and 122 may include a crystal form of $Ni_{10}Cu_1Sn_1$. For example, the internal electrodes 121 and 122 according to the present embodiment may form a lattice structure in which one (1) of twelve (12) Ni atoms is replaced with a Cu atom and the other one (1) is replaced with an Sn atom.

In this case, when the sum W of mass ratios of Cu and Sn to respective internal electrodes 121 and 122 satisfies the range of 0.1 to 4.0 wt %, a difference in lattice constants between respective internal electrodes 121 and 122 and the dielectric layer 111 may be effectively reduced, and electrode connectivity of the internal electrodes 121 and 122 may be improved at the same time.

When the sum of mass ratios of Cu and Sn included in respective internal electrodes 121 and 122 is less than 0.1 wt %, an effect of increasing a lattice constant of Ni may not be sufficiently exhibited due to a very small amount of atoms to be replaced.

When the sum of mass ratios of Cu and Sn included in respective internal electrodes 121 and 122 exceeds 4.0 wt %, a negative effect of decreasing connectivity of the internal electrodes 121 and 122 may be generated due to an excessive addition of atoms, having a lower melting point than Ni.

As described above, the cases in which Cu and Sn are added to Ni has been exemplarily described. In the same manner, an embodiment in which at least one component of Co, Sb, Ru, Pd, Ag, In, Bi, Re, Os, Ir, Pt, and Au is further included in respective internal electrodes 121 and 122 containing Ni as a main component is also possible.

In this case, when the sum of mass ratios of the added components included in respective internal electrodes 121 and 122 is less than 0.1 wt %, an effect of increasing a lattice constant of Ni may not be sufficiently exhibited due to a very small amount of atoms to be replaced.

Therefore, although there is no particular limitation on a mass ratio of Co, Sb, Ru, Pd, Ag, In, Bi, Re, Os, Ir, Pt, or Au included in the internal electrodes 121 and 122 of the present embodiment, the sum of mass ratios of components except for Ni may be 0.1 wt % or more.

In addition, an embodiment in which two or more components among Cu, Sn, Co, Sb, Ru, Pd, Ag, In, Bi, Re, Os, Ir, Pt, and Au are included in the internal electrodes 121 and 122 is also possible. In this case, the sum of mass ratios of components except for Ni may be 0.1 wt % or more.

When the above-described components such as Co, Sb, or the like are added to the internal electrodes 121 and 122, since the added components may be easily reduced during sintering, some Ni atoms may be replaced with an atom newly added in an Ni lattice structure forming the internal electrodes 121 and 122.

Since an atomic size of respective added components has a higher value than that of Ni, a lattice constant of a structure in which some atoms are replaced may have a higher value than a structure formed only of Ni atoms. For example, the added components may play a role of increasing a lattice constant of Ni.

According to an embodiment of the present disclosure, connectivity of respective internal electrodes 121 and 122 may be 87% or more.

Connectivity of an internal electrode may be defined as a ratio of a length of a portion in which the internal electrode is actually formed, relative to a total length of the internal electrode.

Figure 5:
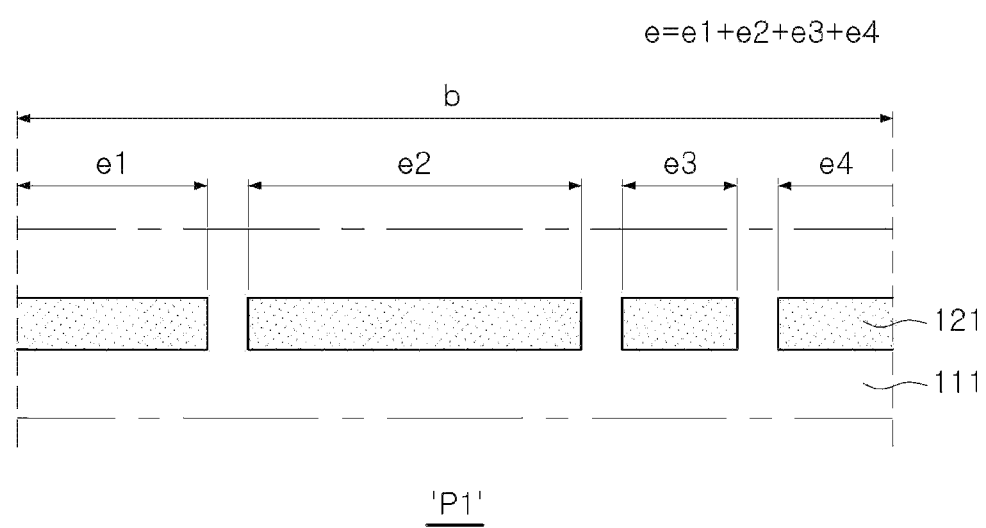
FIG. 5 is an enlarged view illustrating portion 'P1' of FIG. 2.

FIG. 5 is an enlarged view illustrating portion 'P1' of FIG. 2, and may be a view illustrating a definition of connectivity of an internal electrode. Referring to FIG. 5, connectivity of respective internal electrodes 121 and 122 according to the present embodiment will be described.

Referring to FIG. 5, if a total electrode length measured at any one point of the internal electrode 122 is defined as b and lengths of portions in which the internal electrode is actually formed are defined as e1, e2, e3, and e4, respectively, connectivity of the internal electrode may be expressed by e/b, which may be a value obtained by dividing the sum e of lengths of portions in which the internal electrode is actually formed (where, e=e1+e2+e3+e4) by a total electrode length b of the internal electrode.

When connectivity of respective internal electrodes is less than 87%, it may be difficult to secure sufficient capacitance.

According to an embodiment of the present disclosure, since respective internal electrodes 121 and 122 in which some of the components such as Cu, Sn, or the like are added to Ni may increase a lattice constant of Ni forming respective internal electrodes 121 and 122, connectivity of respective internal electrodes may be secured in a range of more than 87%.

It is not necessary to specifically limit an upper limit of connectivity of respective internal electrodes. Considering a manufacturing process, the upper limit thereof may be 97%.

The external electrodes 131 and 132 may be disposed on the body 110, and may be connected to the internal electrodes 121 and 122.

As illustrated in FIG. 2, the external electrodes 131 and 132 may be disposed on the third and fourth surfaces 3 and 4 of the body 110, respectively, and may include first and second external electrodes 131 and 132 respectively connected to the first and second internal electrodes 121 and 122.

Although a structure in which the multilayer electronic component 100 has two external electrodes 131 and 132 is described in the present embodiment, the number, a shape, or the like of the external electrodes 131 and 132 may be changed, depending on a shape of the internal electrodes 121 and 122 or other purposes.

The external electrodes 131 and 132 may be formed using various materials having electrical conductivity such as metal, and a specific material may be determined in consideration of electrical characteristics, structural stability, or the like.

For example, the external electrodes 131 and 132 may be fired electrodes including a conductive metal and a glass, or resin-based electrodes including a conductive metal and a resin.

In addition, the external electrodes 131 and 132 may have a form in which the sintered electrode and the resin-based electrode are sequentially formed on the body 110. In addition, the external electrodes 131 and 132 may be formed by transferring a sheet including a conductive metal onto the body 110 or by transferring a sheet including a conductive metal onto the sintered electrode.

A material having excellent electrical conductivity may be used as a conductive metal included in the external electrodes 131 and 132, and the material is not particularly limited. For example, the conductive metal may be one or more of nickel (Ni), copper (Cu), and alloys thereof.

The first and second external electrodes 131 and 132 may further include a plating layer. The plating layer may include first and second nickel (Ni) plating layers, and first and second tin (Sn) plating layers respectively covering the first and second nickel plating layers.

Hereinafter, a method of manufacturing a multilayer electronic component 100 according to an embodiment of the present disclosure will be described.

First, a plurality of ceramic green sheets may be prepared.

The ceramic green sheets may be for forming a dielectric layer 111 of a body 110. Ceramic powder particles, a polymer, and a solvent may be mixed to prepare a slurry, and the slurry may be formed to have a sheet shape by a method such as a doctor blade or the like.

In this case, the ceramic powder particles included in the slurry forming the dielectric layer may have $BaTiO_3$ as a main component.

Thereafter, internal electrodes 121 and 122 may be formed by printing a conductive paste for internal electrodes on at least one surface of respective ceramic green sheets.

The conductive paste for internal electrodes may include Ni: 96.0 to 99.9 wt % and Cu: 0.1 to 4.0 wt %. For example, the conductive paste for internal electrodes may be formed by mixing Ni powder particles and Cu powder particles, or including Ni—Cu alloy powder particles.

Alternatively, the conductive paste for internal electrodes may include Ni: 96.0 to 99.9 wt % and Sn: 0.1 to 3.0 wt %. For example, the conductive paste for internal electrodes may be formed by mixing Ni powder particles and Sn powder particles, or including Ni—Sn alloy powder particles.

This is illustrative, and the conductive paste for internal electrodes may be formed by adding Cu and Sn to Ni together, and may also be formed by adding components such as Co, Sb, Ru, Pd, Ag, In, Bi, Re, Os, Ir, Pt, Au, or the like to Ni.

The printing method of the conductive paste for internal electrodes may be a screen printing method or a gravure printing method.

Referring to FIG. 4, a plurality of ceramic green sheets laminated by alternately stacking a ceramic green sheet printed with a first internal electrode 121 and a ceramic green sheet printed with a second internal electrode 122 and pressing them in the stacking direction, and internal electrodes formed on the ceramic green sheets may be pressed together, to form a stack body.

In addition, at least one ceramic green sheet may be stacked above and below the stack body, to form cover portions 112 and 113. The cover portions 112 and 113 may have the same composition as the dielectric layer 111 located inside the stack body, and differ from the dielectric layer 111 in that they do not include internal electrodes.

Thereafter, the stack body may be cut into chips for each region corresponding to one (1) capacitor, and may be then sintered at a high temperature to complete the body 110.

Thereafter, second external electrodes 131 and 132 may be formed to be electrically connected to the first and second internal electrodes 121 and 122 by covering exposed portions of the first and second internal electrodes 121 and 122 exposed from both lateral surfaces of the body 110.

In this case, surfaces of the first and second external electrodes 131 and 132 may be plated with nickel (Ni) or tin (Sn), as necessary.

Figure 6:
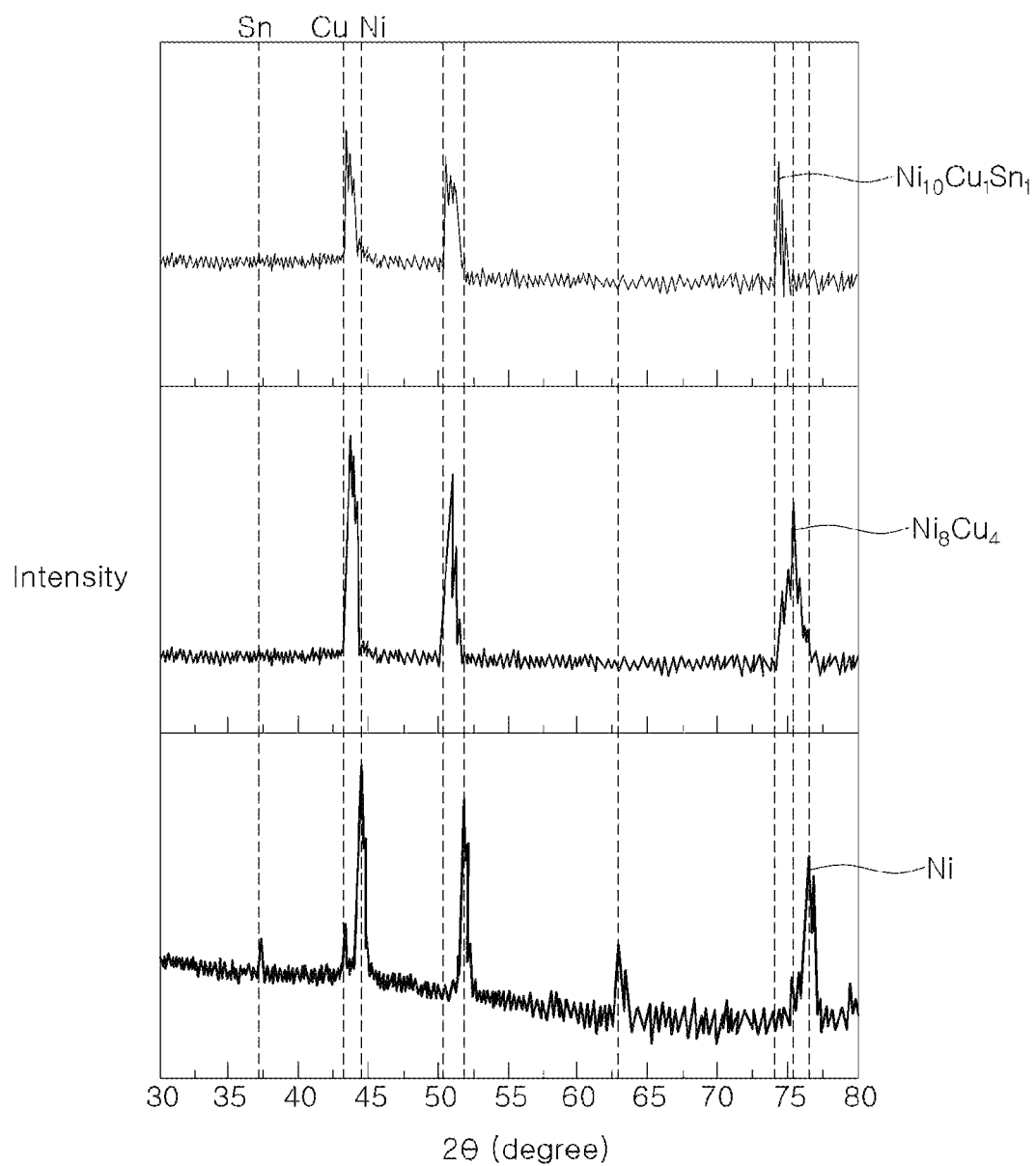
FIG. 6 is a graph of X-ray diffraction (XRD) measurement results illustrating characteristics of increased lattice constant by adding Cu and Sn to Ni, according to an embodiment of the present disclosure.

FIG. 6 is a graph of X-ray diffraction (XRD) measurement results illustrating characteristics of increased lattice constant by adding Cu and Sn to Ni, according to an embodiment of the present disclosure.

The graph of the XRD measurement results according to FIG. 6 illustrates lattice constants of Ni included in internal electrodes 121 and 122 according to embodiments. In this case, a method of deriving the lattice constants according to the XRD graph may follow an X-ray diffraction analysis method used by a person skilled in the art.

For example, a Bragg angle (θ) may be found by a position (2θ) of a peak on the graph, and an interplanar distance may be calculated using Bragg angles of three (3) peaks having the strongest intensity. In this case, a lattice constant of a crystal lattice may be derived by using Bragg's law commonly used in the related technical field and an equation for calculating the interplanar distance of the crystal, respectively.

In deriving a lattice constant of Ni in this manner, it can be seen that the lattice constant increases, as three (3) peaks are located closer to the left side, as illustrated in the graph of the XRD measurement results of FIG. 6.

Referring to FIG. 6, in an embodiment in which other components are not added to Ni (an Ni graph located on a lowermost level of FIG. 6), it can be seen that all three (3) peaks are located at the rightmost. For example, the present embodiment may be interpreted as the smallest lattice constant among the three (3) embodiments illustrated in FIG. 6.

Further, in an embodiment having a crystal form of $Ni_8Cu_4$ by adding Cu to Ni (an $Ni_8Cu_4$ graph located on an intermediate level of FIG. 6), it can be seen that three (3) peaks are located to close to the left side, as compared to the Ni graph. For example, the present embodiment may be interpreted as disclosing that a lattice constant of Ni increases, as compared to an internal electrode formed only of Ni.

In addition, in an embodiment having a crystal form of $Ni_{10}Cu_1Sn_1$ by adding Cu and Sn to Ni (an $Ni_{10}Cu_1Sn_1$ graph located on an uppermost level of FIG. 6), it can be seen that three (3) peaks are located to further close to the left side, as compared to the Ni graph and the $Ni_8Cu_4$ graph. For example, the present embodiment may be interpreted as disclosing that a lattice constant of Ni increases, as compared to an internal electrode formed only of Ni, and may be interpreted as disclosing that a lattice constant of Ni is greater than that of $Ni_8Cu_4$, due to addition of Sn having an atomic size larger than that of Cu.

EXPERIMENTAL EXAMPLES

Table 1 below shows that internal electrodes were prepared using a conductive paste for internal electrodes in which at least one of Cu and Sn was added to Ni in a specific ratio, and Ni lattice constants, electrode connectivity, break down voltages (BDV), and mean-time-to-failures (MTTF) for sample chips including the internal electrodes were measured, respectively.

In Table 1, in Experimental Example 1, an internal electrode was prepared by using a conductive paste for internal electrodes in which Cu or Sn was not added to Ni, and was used as a reference for comparison with other experimental examples.

In this regard, lattice constants of Ni correspond to values measured from images of internal electrodes according to experimental examples, scanned by a transmission electron microscopy (TEM), respectively.

In addition, for electrode connectivity, bodies of the sample chips according to experimental examples were cut from central portions in the width (W) direction, respectively, images of cross-sections of the cut bodies in length and thickness directions (an X-Z plane) were scanned with a scanning electron microscope (SEM), and average values of electrode connectivity derived by measuring lengths of portions in which internal electrodes were actually formed, relative to a total electrode length were described for all of the internal electrodes.

In addition, break down voltages (BDV) were determined by connecting the sample chips according to experimental examples to a circuit and increasing voltages from 0V by 0.5V sequentially, determining values of voltages at points at which a current of 20 mA or higher is achieved as BDV, and listing the values.

In addition, mean-time-to-failures (MTTF) were measured as indicators to determine high temperature reliability, and were determined by conducting a high temperature load test under conditions of 125° C. and 8V on the sample chips according to experimental examples, determining values of the time at which insulation resistance of 10 KΩ or less were achieved as the failure time, and listing the values.

TABLE 1

| Experimental Example | Internal Electrode (wt %) | | Ni Lattice Constant (Å) | Electrode Connectivity (%) | BDV (V) | MTTF (hr) |
|---|---|---|---|---|---|---|
| | Cu | Sn | | | | |
| 1* | 0.0 | 0.0 | 3.52 | 84 | 43 | 28 |
| 2 | 0.1 | 0.0 | 3.53 | 87 | 49 | 31 |
| 3 | 0.0 | 0.1 | 3.54 | 87 | 50 | 32 |
| 4 | 0.5 | 0.0 | 3.55 | 88 | 51 | 35 |

TABLE 1-continued

| Experimental Example | Internal Electrode (wt %) | | Ni Lattice Constant (Å) | Electrode Connectivity (%) | BDV (V) | MTTF (hr) |
|---|---|---|---|---|---|---|
| | Cu | Sn | | | | |
| 5 | 0.3 | 0.3 | 3.57 | 89 | 50 | 37 |
| 6 | 0.0 | 0.5 | 3.58 | 87 | 53 | 34 |
| 7 | 2.0 | 0.0 | 3.59 | 92 | 56 | 40 |
| 8 | 3.0 | 0.0 | 3.61 | 93 | 59 | 54 |
| 9 | 1.0 | 1.0 | 3.62 | 90 | 57 | 44 |
| 10 | 4.0 | 0.0 | 3.64 | 91 | 55 | 51 |
| 11 | 0.0 | 2.0 | 3.65 | 89 | 54 | 43 |
| 12 | 1.5 | 1.5 | 3.66 | 91 | 62 | 48 |
| 13 | 0.0 | 3.0 | 3.70 | 92 | 63 | 59 |
| 14 | 2.0 | 2.0 | 3.72 | 87 | 55 | 56 |
| 15* | 5.0 | 0.0 | 3.73 | 85 | 43 | 30 |
| 16* | 0.0 | 4.0 | 3.74 | 81 | 44 | 25 |
| 17* | 2.5 | 2.5 | 3.74 | 83 | 45 | 27 |
| 18* | 0.0 | 5.0 | 3.80 | 82 | 40 | 21 |

Referring to Table 1, in Experimental Examples 2 to 18 including at least one of Cu and Sn, it can be seen that lattice constants of Ni increased, as compared to Experimental Example 1.

In particular, among experimental examples containing only Cu, in Experimental Examples 2, 4, 7, 8, and 10 in which Cu was included in amounts of 0.1 wt % or more and 4.0 wt % or less, it can be seen that electrode connectivity was improved by 87% or more and BDV and MTTF were also improved, as compared to Experimental Example 15 in which Cu was included in an amount of more than 4.0 wt %.

In addition, among experimental examples containing only Sn, in Experimental Examples 3, 6, 11, and 13 in which Sn was included in amounts of 0.1 to 3.0 wt %, it can be seen that electrode connectivity was improved by 87% or more, and BDV and MTTF were also improved, as compared to Experimental Examples 16 and 17 in which Sn was included in an amount of more than 3.0 wt %.

In addition, among experimental examples in which Cu and Sn were included together, in Experimental Examples 5, 9, 12, and 14 in which the sum of mass ratios of Cu and Sn was 4.0 wt % or less, it can be seen that electrode connectivity was improved by 87% or more and BDV and MTTF were also improved, as compared to Experimental Example 17 in which the sum of mass ratios of Cu and Sn exceeded 4.0 wt %.

In comparing measured values of Experimental Examples 1 and 2, when a mass ratio of Cu or Sn included in respective internal electrodes was less than 0.1 wt %, an amount of Cu or Sn atoms to be replaced was very small. Therefore, it may be interpreted as disclosing that an effect of increasing lattice constants of Ni to be obtained will not be sufficiently exhibited.

In Experimental Examples 15 to 17, it may be interpreted as disclosing that there was an effect of increasing lattice constants of Ni forming respective internal electrodes due to replacement of Cu and Sn atoms, but connectivity of the internal electrode was significantly reduced due to an excessive addition of Cu and Sn, having a lower melting point than Ni. In addition, in Experimental Examples 15 to 17, it can be seen that BDVs thereof were less than 50V, indicating poor breaking down voltage, and MTTFs thereof were also less than 50 hours, indicating that high temperature reliability was insufficient.

Therefore, when Cu is included in respective internal electrodes including Ni as a main component in a range of 0.1 to 4.0 wt %, a difference in lattice constants between respective internal electrodes and the dielectric layer may be effectively reduced, and electrode connectivity, BDV, and high temperature reliability of respective internal electrodes may be improved.

In addition, when Sn is included in respective internal electrodes including Ni as a main component in a range of 0.1 to 3.0 wt %, a difference in lattice constants between respective internal electrodes and the dielectric layer may be effectively reduced, and electrode connectivity, BDV, and high temperature reliability of respective internal electrodes may be improved.

In addition, when the sum of mass ratios of Cu and Sn included in respective internal electrodes including Ni as a main component in a range of 0.1 to 4.0 wt %, a difference in lattice constants between respective internal electrodes and the dielectric layer may be effectively reduced, and electrode connectivity, BDV, and high temperature reliability of respective internal electrodes may be improved.

According to an embodiment of the present disclosure, a difference in lattice constants between atoms forming an internal electrode and a dielectric layer may be reduced to reduce dislocation of an atomic arrangement occurring on an interface therebetween.

In addition, according to an embodiment of the present disclosure, there may be effects of improving connectivity and a breaking down voltage (BDV) of an internal electrode, and extending average failure time (MTTF) to indicating high temperature reliability.

However, the various advantages and effects of the present disclosure are not limited to the above description, and can be more easily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a dielectric layer and internal electrodes alternately stacked with the dielectric layer interposed therebetween; and
an external electrode disposed on the body and connected to the internal electrodes,
wherein one of the internal electrodes includes Ni, and
wherein a lattice constant of Ni included in the one of the internal electrodes satisfies a range of 3.53 Å to 3.72 Å.

2. The multilayer electronic component of claim 1, wherein the one of the internal electrodes further comprises at least one selected from Cu, Sn, Co, Sb, Ru, Pd, Ag, In, Bi, Re, Os, Ir, Pt, and Au.

3. The multilayer electronic component of claim 1, wherein the one of the internal electrodes comprises Ni: 96.0 to 99.9 wt % and Cu: 0.1 to 4.0 wt %.

4. The multilayer electronic component of claim 3, wherein the one of the internal electrodes comprises a crystal form of $Ni_8Cu_4$.

5. The multilayer electronic component of claim 1, wherein the one of the internal electrodes comprises Ni: 97.0 to 99.9 wt % and Sn: 0.1 to 3.0 wt %.

6. The multilayer electronic component of claim 1, wherein the one of the internal electrodes further comprises Cu and Sn,
wherein, 0.1 wt %≤W≤4.0 wt %, in which W is a sum of mass ratios of Cu and Sn relative to a total mass of the one of the internal electrodes.

7. The multilayer electronic component of claim 6, wherein the one of the internal electrodes comprises a crystal form of $Ni_{10}Cu_1Sn_1$.

8. The multilayer electronic component of claim 1, wherein, in the one of the internal electrodes, a ratio of a length of a portion in which respective internal electrodes is actually formed relative to a total length of respective internal electrodes is defined as connectivity of the one of the internal electrodes, and connectivity of the one of the internal electrodes is 87% or more.

9. The multilayer electronic component of claim 1, wherein the one of the dielectric layers comprises $BaTiO_3$.

10. The multilayer electronic component of claim 1, wherein a difference between the lattice constant of Ni included in the one of the internal electrodes and a lattice constant of $BaTiO_3$ comprised in the one of the dielectric layers is 0.469 Å or less.

11. A multilayer electronic component comprising:
a body including a dielectric layer and internal electrodes alternately stacked with the dielectric layer interposed therebetween; and
an external electrode disposed on the body and connected to the internal electrodes,
wherein 0.1 wt %≤W≤4.0 wt %, in which W is a sum of mass ratios of Cu and Sn of one of the internal electrodes relative to a total mass of the one of the internal electrodes.

12. The multilayer electronic component of claim 11, wherein the one of the internal electrodes comprises Ni: 96.0 to 99.9 wt % and Cu: 0.1 to 4.0 wt %.

13. The multilayer electronic component of claim 11, wherein the one of the internal electrodes comprises a crystal form of $Ni_8Cu_4$.

14. The multilayer electronic component of claim 11, wherein the one of the internal electrodes comprises Ni: 97.0 to 99.9 wt % and Sn: 0.1 to 3.0 wt %.

15. The multilayer electronic component of claim 11, wherein the one of the internal electrodes comprises a crystal form of $Ni_{10}Cu_1Sn_1$.

16. The multilayer electronic component of claim 11, wherein, in the one of the internal electrodes, a ratio of a length of a portion in which respective internal electrodes is actually formed relative to a total length of respective internal electrodes is defined as connectivity of the one of the internal electrodes, and connectivity of the one of the internal electrodes is 87% or more.

17. The multilayer electronic component of claim 11, wherein one of the dielectric layers comprises $BaTiO_3$.

18. The multilayer electronic component of claim 17, wherein a difference between the lattice constant of Ni included in the one of the internal electrodes and a lattice constant of $BaTiO_3$ comprised in the one of the dielectric layers is 0.469 Å or less.

* * * * *